Sept. 13, 1966 W. J. OTT 3,272,571
BEARING ASSEMBLY
Filed Oct. 11, 1963 2 Sheets-Sheet 1
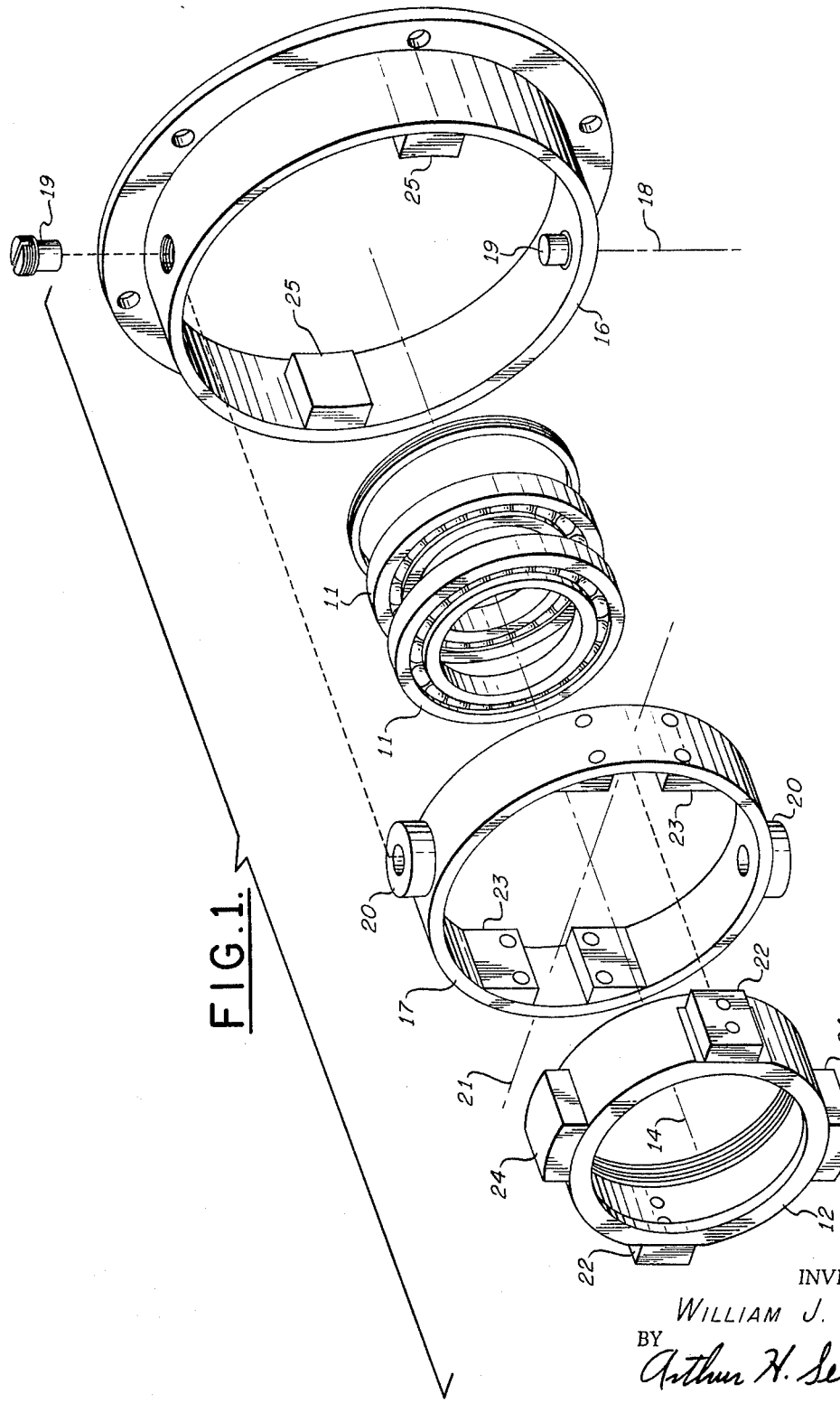
INVENTOR.
WILLIAM J. OTT
BY Arthur H. Serrell
ATTORNEY INVENTOR.
WILLIAM J. OTT
BY Arthur H. Serrell
ATTORNEY 3,272,571
BEARING ASSEMBLY
William J. Ott, Great Neck, N.Y., assignor to Sperry Rand Corporation, Great Neck, N.Y., a corporation of Delaware
Filed Oct. 11, 1963, Ser. No. 315,585
10 Claims. (Cl. 308—26)

This invention relates to a bearing assembly having relatively movable coupling elements and elastic members that isolates one of the parts of the bearing from the other from vibrations along the axis of the movable part of the bearing, along a second axis normal to the bearing axis and along a third axis normal to both the second axis and the bearing axis.

In accordance with the invention, the coupling component of the assembly is provided by three radially spaced elements or rings arranged in concentric and coplanar relation to the bearing axis and in outside, intermediate and inside relation to one another. The connecting means or fastenings between the intermediate and one of the other coupling components provides damping along one of the axes and a rigid connection with relation to the other axes. The connecting means or fastenings between the intermediate and the other of the coupling components provides damping along the other of the axes and a rigid connection along the one of the axes. The elastic members or cushions of the assembly are paired in axially spaced relation on the second and third axis to yieldingly connect the intermediate coupling component to the one and the other of the coupling components. The paired elastic members included in the assembly are deflected in shear along the respective isolation axes. The spring characteristics of the cushions are the same for each axis.

An object of the invention is to provide vibration isolation for a bearing assembly by a combination of coupling components and elastic members that are effective along three mutually perpendicular axes.

A feature of this invention resides in the fastening structure between two of the coupling components that provides a rigid connection along two of the axes of the assembly and a damping connection along the third axis.

A further feature of the invention resides in the fastening structure between two of the coupling components that provides a rigid connection along one of the axes of the assembly and a damping connection along the other two axes.

A still further feature of the invention resides in the paired cushion structure arranged in spaced axial relation between the respective coupling components with relation to two of the axes of the assembly.

Further objects, features and structural details of the present invention will be apparent from the following description when read in relation to the accompanying drawing, wherein:

FIG. 1 is a perspective view of the improved bearing assembly showing the coupling component in exploded relation along the axis of the movable part of the bearing;

Figures 2, 3:
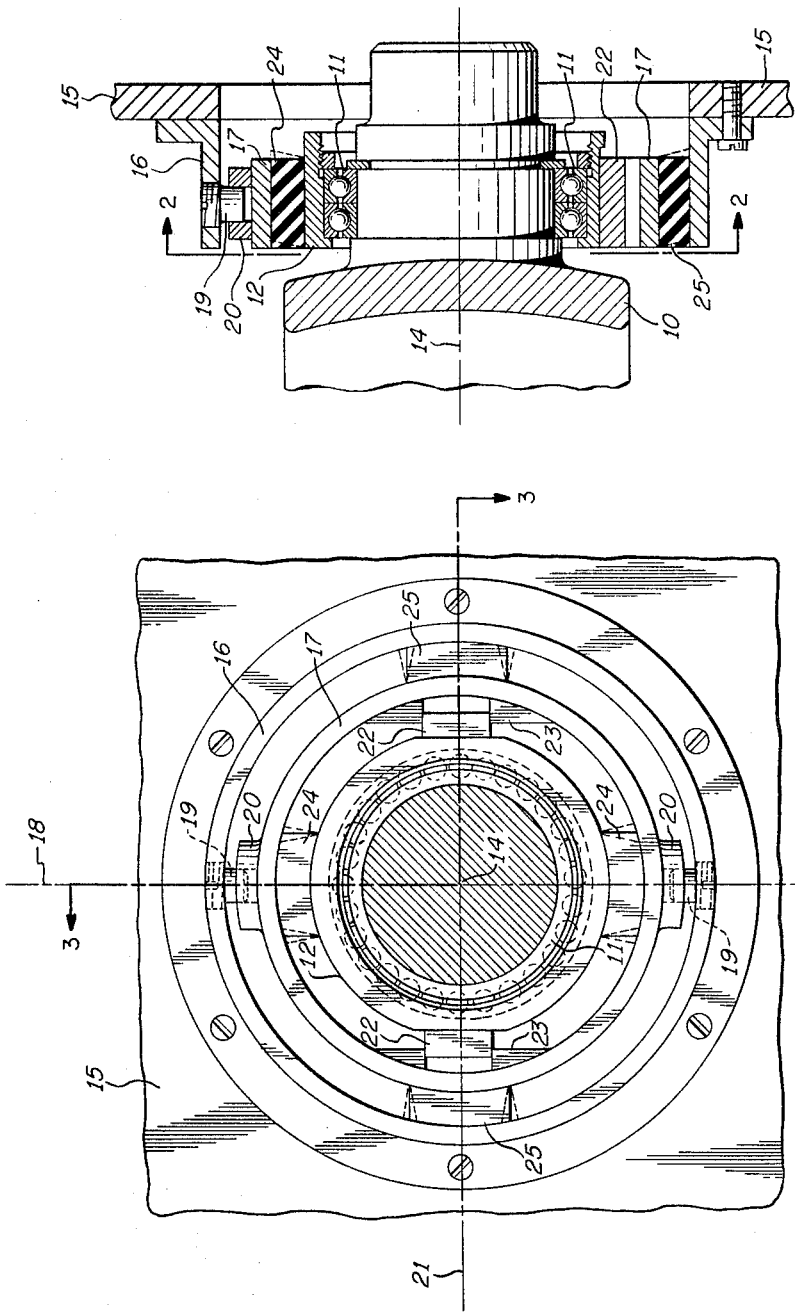
FIG. 2 is a sectional view of the assembled bearing shown in FIG. 1 taken on line 2—2, in FIG. 3.
FIG. 3 is a sectional view taken on line 3—3, in FIG. 2.

In the ball bearing type of assembly shown in the drawing, the movable part of the bearing is represented as the trunnion of a gimbal ring 10. Ball bearings 11 travel between the provided conventional races in the assembly, one of the races being suitably fixed to the trunnion. The other of the bearing races is suitably fixed to an inside ring or coupling element of the asssembly indicated at 12. As shown, the axis of the bearing assembly indicated at 14 corresponds to the axis of the ring 10 and its trunnion. The fixed part of the bearing assembly is provided by a mounting plate 15 to which an outside ring or coupling element 16 is fixedly connected.

The coupling component of the improved bearing assembly includes outside ring or element 16, the inside ring or element 12 and an intermediate ring or element 17 therebetween, as shown in FIG. 2. In the improved assembly, the three radially spaced rings or elements 16, 17 and 12 of the coupling component are arranged in concentric and coplanar relation to the axis 14 and in respective outside, intermediate and inside relation to one another.

In the improved assembly, the coupling elements 17 and 16 are interconnected by fastenings along a second axis 18 normal to the bearing axis 14 by means of a pair of relatively slideable pins 19 and bushings 20 that are axially spaced with relation to axis 18. In the structure shown, the bushings 20 are located on the ring 17 and the pins 19 are suitably fixed on the ring 16. The interconnections located between the coupling elements 16 and 12 are fastenings along a third axis 21 by means of a pair of relatively slideable keys 22 and keyways 23 that are axially spaced with relation to axis 21. The pin 19—bushing 20 fastening between the intermediate ring 17 and outside 16 provides a slideable connection between two of the coupling elements that damps the relative movement between the elements with relation to the axis 18 and provides a rigid connection with relation to the third axis 21 and bearing axis 14. The key 22—keyway 23 fastening between the intermediate 17 and inside ring 12 provides a slideable connnection therebetween that damps the relative movement of the elements with relation to the bearing axis 14 and third axis 21 and provides a rigid connection with relation to the second axis 18. In the assembly shown, the aligned keyways 23 are located on the intermediate ring 17 and the keys 22 are suitably fixed on the inside ring 12. The fastenings provided between the intermediate and the respective outside and inside coupling rings are interchangeable with the respective second and third axes. Accordingly, one of the fastenings provides damping along one of the axes and a rigid connection between the other of the axes. The other of the fastenings provides a rigid connection for the axis that the one fastening provided damping and damping connections for the axes that the one fastening provided rigid connections.

The coupling structure of the improved assembly further includes pairs of axially spaced elastic members or flexible cushions that yieldingly connect the intermediate element 17 with both of the elements 16 and 12 of the bearing assembly. In FIG. 2, the included cushions arranged in spaced relation along axis 18 are indicated at 24 and the cushions arranged in spaced relation along axis 21 are indicated at 25. In the arrangement shown, the cushions 24 yieldingly maintain the spacing between the inside coupling ring 12 and the intermediate coupling ring 17. Similarly, the cushions 25 maintain the spacing between the outside coupling ring 16 and the intermediate coupling ring 17. The cushions 24 and 25 are preferably formed of a solid piece of rubber material that in compressed condition conform to the curvature of the respective rings of the coupling structure.

Vibrations of one of the parts of the assembly along bearing axis 14 are isolated from the other part by the relative deflection in shear of the cushions 24 between the inside ring 12 are intermediate ring 17 as indicated by the dash lines in FIG. 3 with the relative movement between the noted rings along the axis 14 damped by the key 22—keyway 23 fastening. The same result is provided with relation to axis 21 by the cushions 24 deflected as indicated by the dash lines in FIG. 2 with the motion occurring along the axis 21. In both of these isolative operations, there is no relative movement between the intermediate ring 17 and outside ring 16 as the same are rigidly connected by the pin 19—bushing 20 fastening. Vibrations along the axis 18 of the assembly are isolated by the cushions 25 deflected as indicated by the dash lines in FIG. 2 with relative movement between the outside ring 16 and intermediate ring 17. Here, the ring 17 and inside ring 12 are rigidly connected by the key 22—keyway 23 fastening as the pin 19—bushing 20 fastening permits movement along the axis.

While the invention has been described in its preferred embodiments, it is to be understood that the words which have been used are words of description rather than of limitation and that changes within the purview of the appended claims may be made without departing from the true scope and sprit of the invention in its broader aspects.

What is claimed is:

1. A vibration isolating bearing assembly including a bearing having a part movable about an axis, a coupling having three radially spaced elements arranged in concentric and coplanar relation to the bearing axis and in outside, intermediate and inside relation to one another for isolating the bearing from vibrations along the bearing axis, along a second axis normal to the bearing axis and along a third axis normal to the bearing and second axes, an axially spaced pair of slideable fastenings between the intermediate element and one of the other elements providing damping along the second axis and a rigid connection with relation to the bearing and third axes, an axially spaced pair of slideable fastenings between the intermediate element and the other of the elements providing damping along the bearing and third axes and a rigid connection with relation to the second axis, a pair of elastic members axially spaced along the second axis yieldingly connecting the intermediate element and the other of the elements, and a second pair of elastic members axially spaced along the third axis yieldingly connecting the intermediate element and the one of the elements.

2. An assembly of the character claimed in claim 1, in which the radially spaced elements of the coupling assembly are rings.

3. An assembly of the character claimed in claim 1, in which the fastenings along the second axis are provided by pins on one of the elements and bushings on the other of the elements.

4. An assembly of the character claimed in claim 1, in which the fastenings along the bearing and third axes are provided by keys on one of the elements and keyways on the other of the elements.

5. An assembly of the character claimed in claim 2, in which the elastic members are solid rubber cushions that in compressed condition conform to the curvature of the rings and deflect in shear along the respective isolation axes.

6. A vibration isolating bearing assembly including a bearing having a part movable about an axis, a coupling having three rings arranged in concentric and coplanar relation to the bearing axis and in outside, intermediate and inside relation to one another for isolating the bearing from vibrations along the bearing axis, along a second axis normal to the bearing axis and along a third axis normal to the bearing and second axes, means between the intermediate ring and one of the other rings providing a rigid connection along the bearing and third axes and a damping connection along the second axis, means between the intermedate ring and the other of the rings providing a rigid connection along the second axis and a damping connection along the bearing and third axes, a pair of flexible cushions arranged in spaced relation along the second axis between the intermediate ring and the other of the rings, and a pair of flexible cushions arranged in spaced relation along the third axis between the intermediate ring and the one of the rings.

7. An assembly of the character claimed in claim 6, in which the connection means providing damping along the second axis is provided by a pair of axially aligned pins on one of the rings and a pair of bushings on the other of the rings.

8. An assembly of the character claimed in claim 6, in which the connection means providing damping along the bearing and third axes is provided by a pair of axially aligned keys on one of the rings and a pair of keyways on the other of the rings.

9. An assembly of the character claimed in claim 6, in which the cushions are formed of a rubber material that in compressed condition conforms to the curvature of the rings to deflect in shear along the respective isolation axes.

10. A vibration isolating bearing assembly including a bearing having a part movable about an axis, a coupling having three rings arranged in concentric and coplanar relation to the bearing axis and in outside, intermediate and inside relation to one another for isolating the bearing from vibrations along the bearing axis, along a second axis normal to the bearing axis and along a third axis normal to the bearing and second axes, means between the intermediate and outside rings providing a rigid connection along the bearing and third axes and a damping connection along the second axis, means between the intermediate and inside rings providing a rigid connection along the second axis and a damping connection along the bearing and third axes, a pair of elastic members axially spaced along the second axis yieldingly connecting the intermediate and inside rings, and a pair of elastic members axially spaced along the third axis yieldingly connecting the intermediate and outside rings.

References Cited by the Examiner

UNITED STATES PATENTS

| | | | |
|---|---|---|---|
| 2,518,861 | 7/1950 | Campbell | 308—26 |
| 2,550,101 | 4/1951 | Wallerstein | 64—31 X |

DAVID J. WILLIAMOWSKY, *Primary Examiner.*

N. ABRAMS, *Assistant Examiner.*